No. 735,241. PATENTED AUG. 4, 1903.
F. H. GILBERT.
BELT TIGHTENER.
APPLICATION FILED MAR. 21, 1903.
NO MODEL.
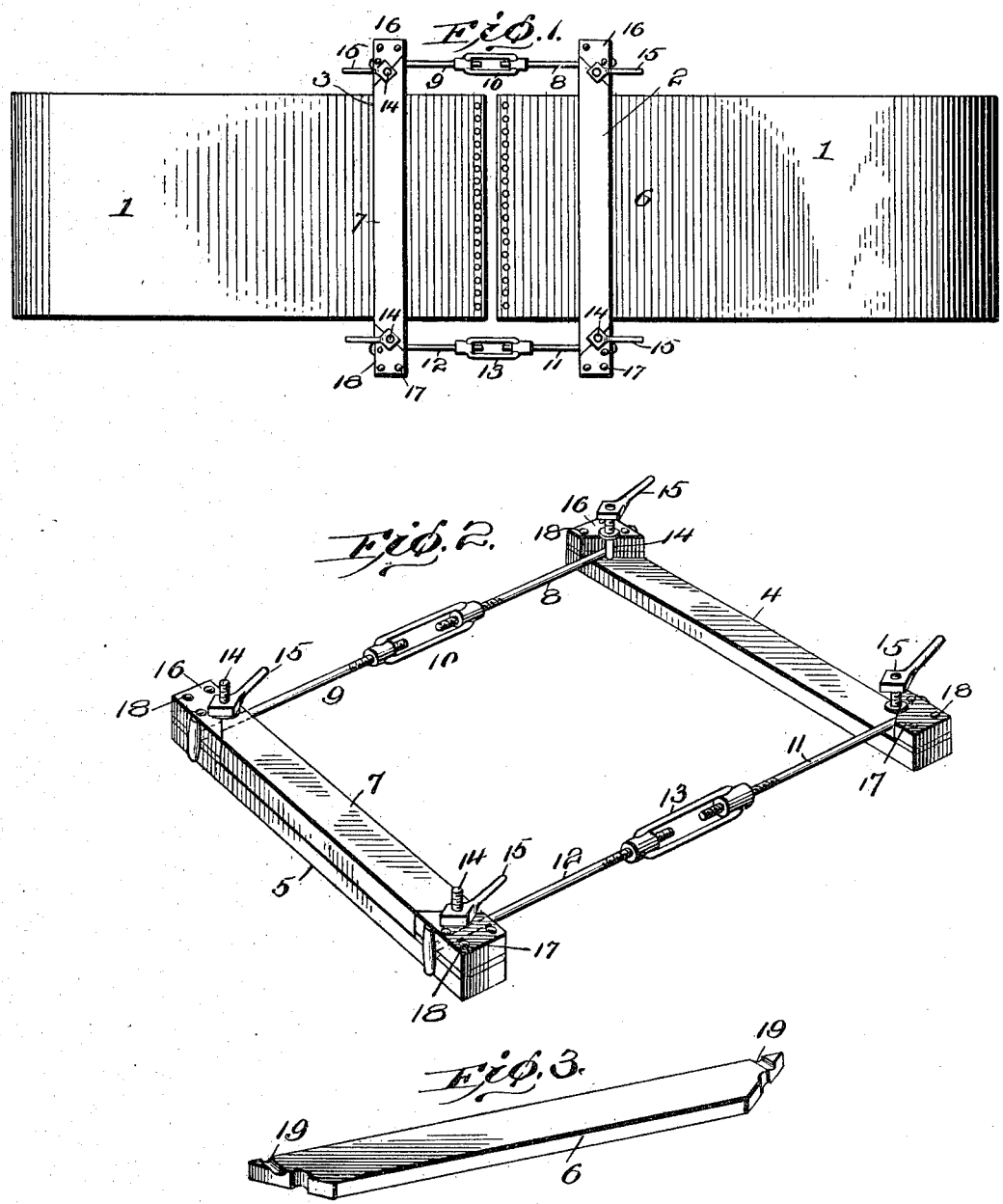

No. 735,241. Patented August 4, 1903.

UNITED STATES PATENT OFFICE.

FRANK H. GILBERT, OF SPRINGFIELD, WISCONSIN.

BELT-TIGHTENER.

SPECIFICATION forming part of Letters Patent No. 735,241, dated August 4, 1903.

Application filed March 21, 1903. Serial No. 148,894. (No model.)

*To all whom it may concern:*

Be it known that I, FRANK H. GILBERT, a citizen of the United States, residing at Springfield, in the county of Walworth and State of Wisconsin, have invented certain new and useful Improvements in Belt-Tighteners; and I do hereby declare the following to be a full, clear, and exact description of the invention, such as will enable others skilled in the art to which it appertains to make and use the same.

My invention relates to certain new and useful improvements in belt holders and tighteners, and my object is to provide a device whereby the ends of a belt such as is used in driving machinery, &c., may be drawn together and securely held while being laced or otherwise secured together without removing the belt from the belt-wheels.

Other objects and advantages will be more clearly pointed out in the specification, taken in connection with the accompanying drawings, in which—

Figure 1 is a plan view of my device applied to use upon a belt. Fig. 2 is a perspective view of the device with one section of one of the clamping-jaws removed, and Fig. 3 is a perspective view of the upper section of one of the clamping-jaws.

Referring to the drawings, in which similar reference characters designate similar parts in all the views, 1 indicates a belt such as is used in driving machinery. In this class of belting the strain upon the belt, and especially the main driving-belt, tends to stretch the same, so that it requires occasional tightening, and also the lacing sometimes becomes broken or loosened, so that it requires tightening, and to accomplish this result without removing the belt from the pulleys I provide the clamping members 2 and 3, comprising the main jaws 4 and 5 and the auxiliary jaws 6 and 7. The members 2 and 3 are joined together through the medium of the rods or bolts 8 and 9 and turnbuckle 10 at one end of said members and bolts 11 and 12 and turnbuckle 13 at the opposite end of said members. The jaws 6 and 7 are held in place and caused to grip the belt between themselves and the jaws 4 and 5, respectively, by means of the bolts 14 and the lever-nuts 15. The jaws 6 and 7 are adapted to be entirely removed from the jaws 4 and 5 and have their respective ends cut at an oblique angle to their longitudinal plane, the line of the angles intersecting the center of the bolts 14, as shown.

Secured to each end of the jaws 4 and 5 are blocks 16 and 17, respectively, said blocks having their inner ends obliquely severed, against which is adapted to take the obliquely-severed ends of the auxiliary jaws 6 and 7, thus forming seats upon said jaws 4 and 5 for the auxiliary jaws 6 and 7. The blocks 16 and 17 are secured to the jaws 4 and 5 in any preferred way, as by bolts 18, or they may be formed integral therewith.

The oblique ends of the jaws 6 and 7 are caused to come into true registration with the oblique ends of the blocks 16 and 17, respectively, through the medium of the notches or grooves 19, cut in the under side of said jaws, said grooves being designed to register with and fit over the rods 8 11 and 9 12, respectively, in view of which any lateral movement of said jaws is prevented.

In operation the jaws 6 and 7 are released and removed from off the jaws 4 and 5 and the members 2 and 3 placed beneath the belt, so that the severed ends of said belt will be approximately centrally disposed between said members 2 and 3, the body of the belt resting upon the jaws 4 and 5 between the end blocks 16 and 17. The jaws 6 and 7 are then placed in position and the nuts 15 turned home upon the bolts 14, when the belt will be firmly gripped between said jaws. When the belt is thus gripped, the members 2 and 3 may be drawn toward each other through the medium of the turnbuckles 10 and 13 and the rods 8 9 and 11 12, respectively. By this means it will be seen that the ends of the belt may be drawn together and held firmly in place until the said ends are fastened together without removing said belt from the pulleys.

Another and very important advantage in using my device is that when the belt becomes stretched and it is desired to remove a portion of the belt to give it the right tension the device may be placed into engagement with the severed ends of the belt and said belt then drawn to the proper tightness around the pulleys, when the proper length may be cut from the belt and the ends then secured together. This enables the operator to obtain the exact tension upon the belt, which would not be the case if the belt had to be removed from the pulleys.

While I have shown and described the preferred construction and combination of parts in carrying out my invention, it will be understood that I desire to comprehend in this application such substantial equivalents and substitutes as may be considered as falling fairly within the scope and purview of my invention.

Having thus fully described my invention, what I claim as new, and desire to secure by Letters Patent, is—

1. A belt grip and tightener comprising the combination with the main jaws 4 and 5 having suitable seats of the inwardly-directed threaded rods and turnbuckles thereon; auxiliary jaws 6 and 7 adapted to fit said seats and having grooves on their under sides adapted to fit over said rods whereby said jaws will be held against endwise movement and means to clamp said jaws together substantially as and for the purpose set forth.

2. In a belt grip and tightener, the combination with a belt of stationary jaws 4 and 5; blocks at both ends of said jaws, said blocks having their inner ends cut at an oblique angle; means to secure said blocks to said jaws; movable jaws 6 and 7, said jaws having their ends cut at an oblique angle and also having grooves or recesses on their under side; means to clamp said jaws upon the belt and additional means to draw said jaws toward each other, substantially as and for the purpose set forth.

In testimony whereof I affix my signature in presence of two witnesses.

FRANK H. GILBERT.

Witnesses:
R. HOLMES,
J. T. FLANDERS.